(12) United States Patent
Neuhaus

(10) Patent No.: US 6,279,872 B1
(45) Date of Patent: Aug. 28, 2001

(54) QUICK-ACTING VALVE

(75) Inventor: Dietmar Neuhaus, Duesseldorf (DE)

(73) Assignee: Deutsches Zentrum fuer Luft-und Raumfahrt e.V., Bonn (DE)

( * ) Notice: Subject to any disclaimer, the term of this patent is extended or adjusted under 35 U.S.C. 154(b) by 0 days.

(21) Appl. No.: 09/485,557

(22) PCT Filed: Aug. 12, 1998

(86) PCT No.: PCT/EP98/05091

§ 371 Date: Feb. 14, 2000

§ 102(e) Date: Feb. 14, 2000

(87) PCT Pub. No.: WO99/08030

PCT Pub. Date: Feb. 18, 1999

(30) Foreign Application Priority Data

Aug. 12, 1997 (DE) ............................................. 197 34 845

(51) Int. Cl.⁷ ................................................. F16K 31/02
(52) U.S. Cl. .............................. 251/129.06; 251/129.14; 251/349
(58) Field of Search ....................... 251/129.06, 349, 251/129.14; 239/102.2

(56) References Cited

U.S. PATENT DOCUMENTS

| | | | |
|---|---|---|---|
| 3,819,116 | * | 6/1974 | Goodinge et al. .......... 251/129.14 X |
| 3,949,938 | * | 4/1976 | Goodinge .................. 251/129.14 X |
| 4,176,822 | * | 12/1979 | Chadwick ....................... 251/129.06 |
| 4,762,300 | * | 8/1988 | Inagaki et al. .................... 251/129.06 |
| 4,907,748 | * | 3/1990 | Gardner et al. .............. 251/129.06 X |
| 4,971,106 | * | 11/1990 | Tsutsui et al. .............. 251/129.06 X |
| 5,076,314 | * | 12/1991 | Ikehata et al. ............... 251/129.06 X |
| 5,125,625 | * | 6/1992 | Gooch, IV et al. .................. 251/349 |

FOREIGN PATENT DOCUMENTS

| | | | |
|---|---|---|---|
| 3835788 | | 10/1988 | (DE) . |
| 1-105080 | * | 4/1989 | (JP) ................................ 251/129.06 |
| 63-1999978 | * | 8/1998 | (JP) ................................ 251/129.06 |
| 846800 | * | 7/1981 | (SU) ................................ 251/129.06 |

OTHER PUBLICATIONS

Journal O+P Olhydraulik und Pneumatik 38 (1994), No. 9, pp. 554–562.
Journal VDI–Z 119 (1977), No. 11–Jun. (1), pp. 569–570.

* cited by examiner

Primary Examiner—Kevin Shaver
Assistant Examiner—John Bastianelli
(74) Attorney, Agent, or Firm—Diller, Ramik & Wight

(57) ABSTRACT

A valve has a chamber (11) in a housing (10), in which the valve seat (17) is closed by a valve body (19). The valve seat (17) is supported by an actuator (15) which is capable of axially expanding and contracting. In response to an actuating signal the actuator (15) contracts which causes the valve seat (17) to move away from the valve body (19) so rapidly that the valve body (19) is not capable of following, which produces a flow passing through the valve seat (17). The flow pushes the valve body (19) back into the closed position. The valve allows short switching times and a high repetition rate to be achieved.

25 Claims, 4 Drawing Sheets

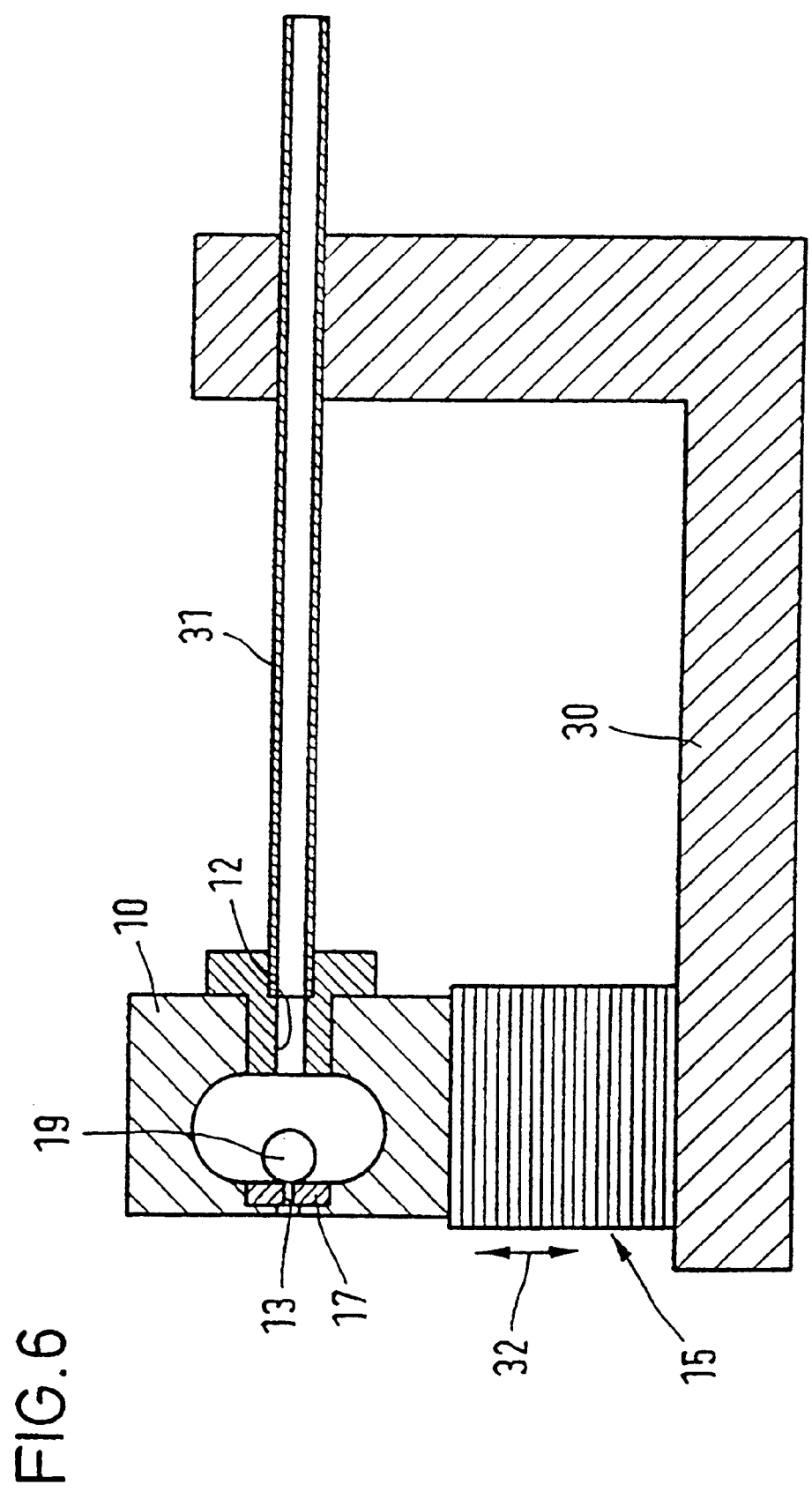

QUICK-ACTING VALVE

BACKGROUND OF THE INVENTION

The invention relates to a quick-acting valve having a chamber which comprises an inlet opening, an outlet opening and a valve seat which can be closed with a movable valve body.

For certain applications quick-acting valves are required which are capable of permitting a fluid flow to pass abruptly through them as well as allowing a high switching rate. Applications for such valves are for example spectrometers where gas samples of precisely measured volumes are subjected to a spectrographic examination, the energizing of the control nozzles of satellites and the field of microsystem technology. For such applications valves with extremely short switching times and high repetition rate are required.

DE 38 35 788 A1 describes a quick-acting ball valve comprising a ball seated in a valve seat. An actuator device acting transversely to the valve seat allows the ball to be removed from the valve seat by a lateral impact. The resultant flow pushes the ball back to the valve seat. This quick-acting valve has turned out to be successful in practical application.

In the journal O+P "Ölhydraulik und Pneumatik" 38 (1994), no. 9, pages 554–562, employment of piezoelectric actuators for quick-acting actuating drives are described. Piezoelectric actuators are used for example in dosing units for fluids with the actuator being attached to a nozzle tube which injects the fluid into an air jet. In this way quick-acting dosing devices suitable for various viscosities and droplet rates can be realized.

In the journal VDI-Z 119 (1977), no. 11-June (1), pages 569–570 a valve for fuel injection is described where a piezoelectric rod expands and contracts to control the valve opening process according to the pulse duration/modulation principle.

SUMMARY OF THE INVENTION

It is the object of the invention to provide a quick-acting valve which is improved with regard to short switching times, high repetition rate and numbers of cycles limiting the service life.

According to the invention this object is solved in accordance with the features stated in claim 1.

In the valve of the invention the valve seat is connected with an actuator which, when being operated, moves the valve seat and removes it from the valve body at such a high acceleration rate that the valve body is not capable of following and is lifted off the valve seat. The passage of the valve seat is opened for a short defined period until the valve body returns to the valve seat under the force exerted by the flowing medium and closes it. Then the actuator sets the valves seat which is closed by the valve body back to its initial position so that the next cycle can be carried out.

The quick-acting valve of the invention may be configured in such a way that short switching times in the order of max. 100 µs are realized. In the practice repetition rates of 400 to 1000 Hz have been attained. The response rate and the repetition rate depend, of course, on the overall size of the valve and in particular on the mass of the valve body. The valve body should have a low density which results in a small mass. The valve body may for example be executed as a hollow body.

The valve of the invention is in particular provided for controlling gases. It may however also be used for controlling fluids. For example, the valve is suited for fuel injection in internal combustion engines.

The actuator supporting the valve body is preferably executed as piezoelectric contraction body which contracts in response to an actuating signal. Alternatively, the actuator may for example also operated as an electromagnetic unit. It is essential that a high acceleration of the valve seat is achieved for a short period, which is higher than the acceleration of the valve body subjected to the medium pressure.

A particular advantage of the valve according to the invention is the low wear rate of valve body and valve seat. Since the valve seat moves away from the valve body in axial direction and subsequently takes up the valve body also moving ing axial direction, the impact forces are distributed annularly onto the valve seat and the valve body. For further wear reduction the actuator is controlled in such a way according to the invention that, in response to an actuating signal, it moves the valve seat quickly and then more and more slowly in order to smoothly catch the ball lifted off the valve seat.

A ball may be used as valve body. However, the invention is not limited to this configuration, it is rather also possible to use a conical or similarly shaped valve body.

In the following embodiments of the invention are explained in detail with reference to the drawings in which:

BRIEF DESCRIPTION OF THE DRAWINGS

FIG. 5 shows another embodiment of the valve of the invention and FIG. 6 shows an embodiment where the actuator acts in the plane of the valve seat.

DESCRIPTION OF THE PREFERRED EMBODIMENTS

Figure 1:
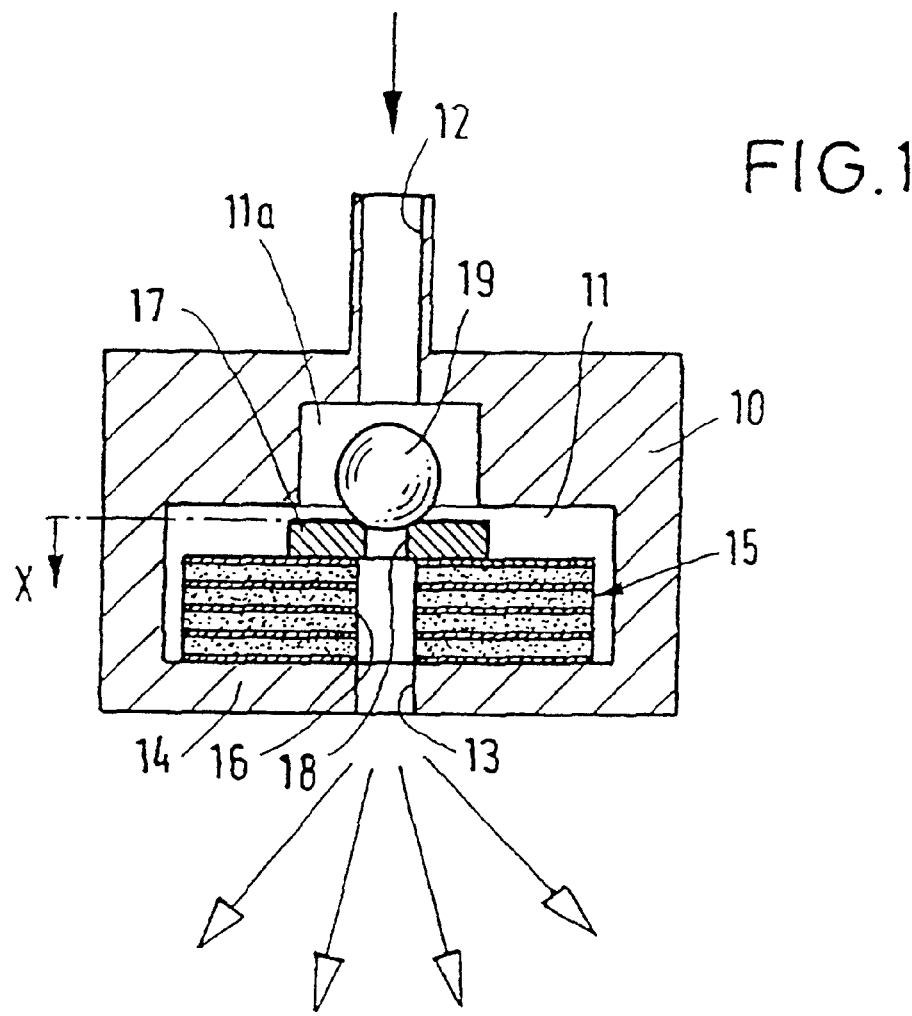
FIG. 1 shows a schematic longitudinal section of a quickacting valve of the invention.

According to FIG. 1 the valve comprises a housing 10 encircling a chamber 11 which is closed towards the environment. The chamber 11 comprises an inlet opening 12 and an outlet opening 13 which are arranged along a common axis. The inlet opening 12 is connected to a pressure source (not shown) for the medium to be controlled, while the outlet opening 13 is connected with the consumer.

On the housing 10 the bottom wall 14 surrounding the outlet opening 13 an actuator 15 is arranged through which an outlet duct 16 passes which is connected with the outlet opening 13. To the actuator 15 a valve seat 17 is attached, said valve seat comprising a disk, preferably made of metal, provided with a central porthole 18. On said porthole 18 the valve body 19 is seated which is configured here as a ball sealingly closing the porthole. The valve seat 17 and the actuator 15 form a unit sealingly connected with the housing 10. The valve body 19 is arranged coaxially to the inlet duct 12 and is located in an extension of the chamber 11 which the extension serving as receiving chamber 11a for the valve body 19. The diameter of the receiving chamber 11a is at maximum 5 times the diameter of the valve body 19. This ensures that a flow passing through the receiving chamber 11a centers the valve 19 relatively to the porthole 18 from any position so that the valve body is moved by the fluid flow into its closing position.

Figure 2:
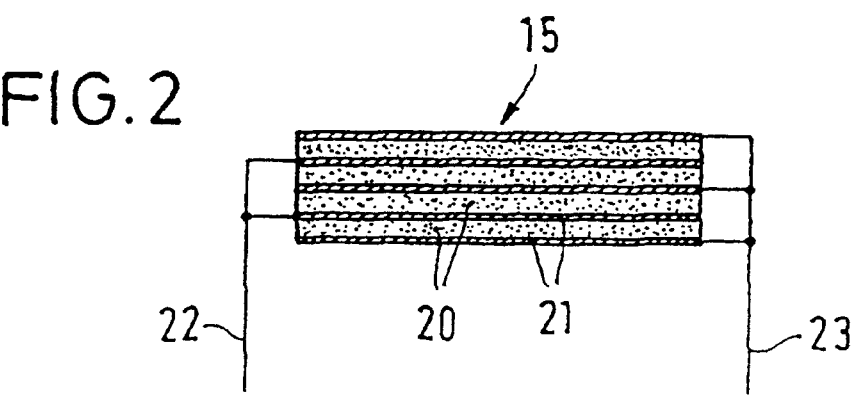
FIG. 2 shows a section of the actuator.

FIG. 2 shows a schematic section of the actuator 15. Said actuator is a piezoelectric contraction body made up of a plurality of piezoelectric layer 20 arranged in parallel between which thin metal sheets 21 are located. Every second sheet 21 is connected with a first electrical line 22 and the intermediate sheets are connected with a second electrical line 23. In this way a plurality of capacitors with piezoelectric material as dielectric material are formed. When a voltage is applied to lines 22 and 23, the piezoelectric layers 20 expand. When the voltage is reduced or cut off, these layer contract.

The valve shown in FIG. 1 operates as follows: In the idle state a voltage is applied to the lines 22, 23 of the actuator 15, which causes the actuator to assume the expanded condition. Owing to this the valve seat 17 is maintained at a given level in the chamber 11. The valve body 19 obturates the porthole 18 of the valve seat so that the pressurized medium at the inlet opening 12 cannot flow to the outlet opening 13. In response to an actuating signal the voltage at the actuator 15 is reduced so that the actuator 15 contracts in axial direction. This causes the valve seat 17 to move away from the valve body 19 in axial direction. The valve body 19 remains in the previously assumed position due to its mass inertia. This causes the porthole 18 of the valve seat 17 to be opened and the fluid to flow around the valve body 19 and passing via the porthole 18 through the valve. Due to the effect of said flow the valve body 19 is moved towards the valve seat 17 and then closes the porthole 18 again. When the valve body 19 has reached the valve seat 17, the actuator 15 expands again so that the valve seat and the valve body return into the initial position shown in FIG. 1.

The valve does not only operate in the vertical position shown in FIG. 1 but also in any other orientation. The reason for this is that the forces exerted by the flow which push the valve body 19 back to the valve seat 17 are considerably larger than the gravity given a sufficient pressure difference prevails between the inlet 12 and the outlet 13.

Contrary to the embodiment shown in FIG. 1 it is also possible to arrange the actuator 15 at the upper side of the housing wall and the valve seat 17 at the lower side of the actuator. In this case the actuator is temporarily expanded for the purpose of moving the valve seat 17 away from the valve body 19.

Figure 3:
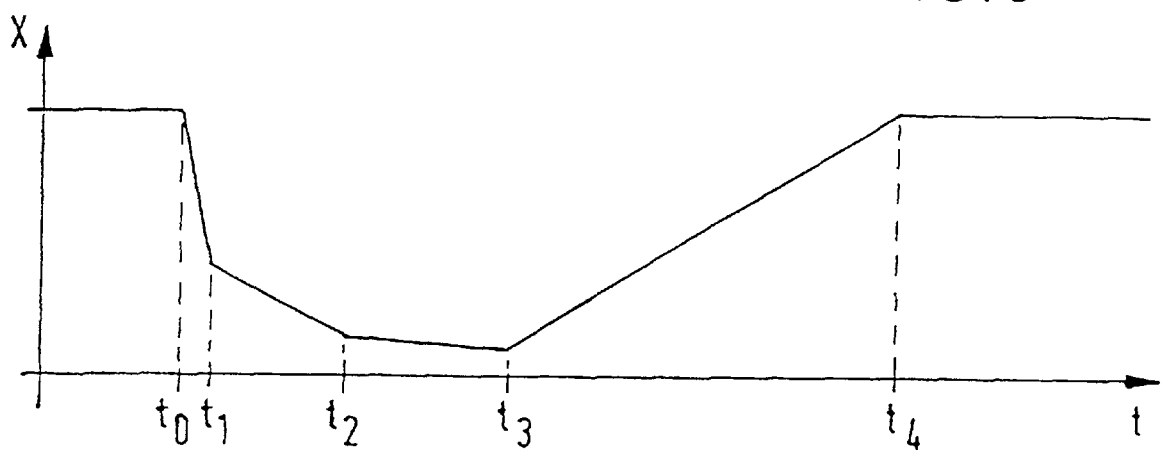
FIG. 3 shows a time diagram of the movement of the valve seat in response to an actuating signal.

Control of the actuator 15 is effected by a control unit (not shown) to which the actuating signal is fed. FIG. 3 shows the position x along the ordinate, which is assumed by the valve seat 17 in axial direction in the housing 10. Along the abcissa time t is plotted. At time to the actuating signal is generated. This causes the actuator 15 to contract rapidly until time $t_1$ has been reached. The interval between $t_0$ and $t_1$ is the valve opening time. Then the actuator 15 is further contracted duing a catching period which continues up to time $t_2$, but this contraction takes place at a considerably lower velocity. During the catching period extending from $t_1$ to $t_2$ the valve body 19 is smoothly taken up by the valve seat 17 so that a heavy impact is prevented and the wear rate reduced. At time $t_3$ the return phase begins in which the actuator 15 slowly expands again and it reaches its initial position at time $t_4$. Then the valve is ready for performing a new opening cycle.

Figure 4:
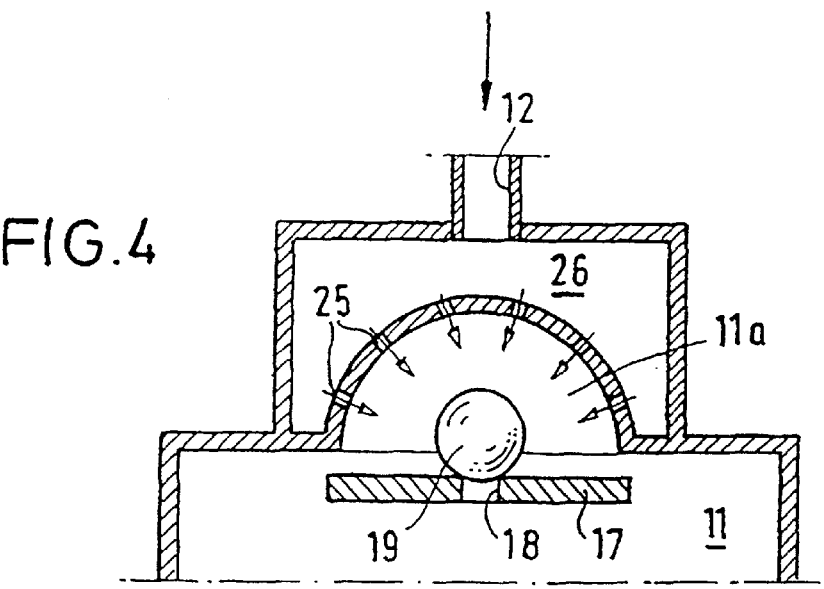
FIG. 4 shows a second embodiment of the chamber containing the valve body.

FIG. 4 shows another embodiment of the valve where the shape of the receiving chamber 11a containing the valve body 19 differs from that shown in FIG. 1. In this case the receiving chamber 11a is executed as a sphere or a semisphere whose central point is located approximately at the central point of the valve ball when the latter is seated on seat 17. In the wall of the receiving chamber uniformly distributed openings 25 are arranged through which the medium can flow towards the ball.

First the inlet opening 11 leads into a distribution chamber 26 out of which the medium flows through the openings 25. The spherical configuration of the receiving chamber 11a offers the advantage of improved centering of the valve body 19 relatively to the porthole 18 of the valve seat. The valve chamber 11a limits the movement of the valve body 19 and ensures by its shape and size that a flow passing through the porthole 18 pushes the valve body 19 back into the closing position.

Figure 5:
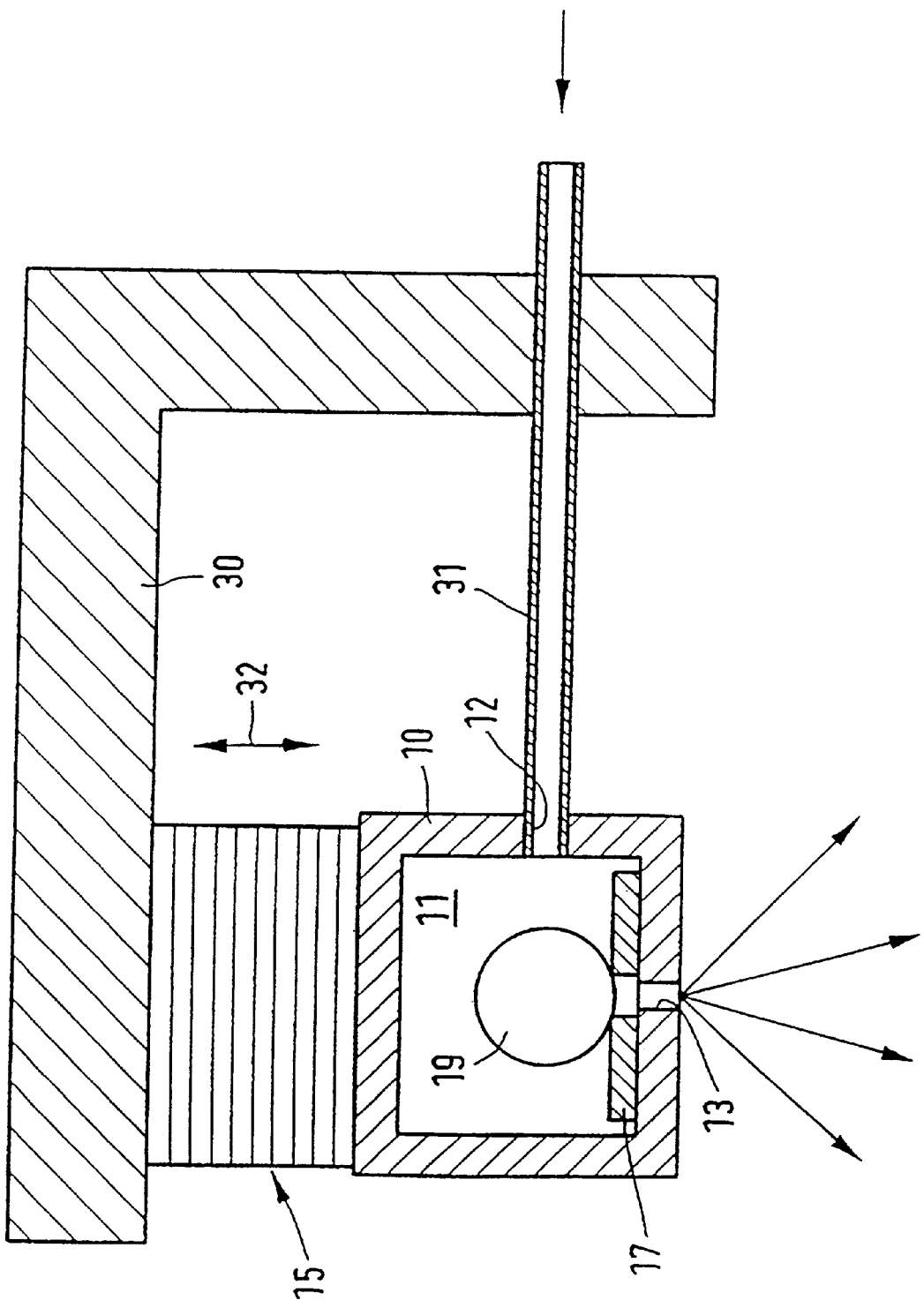

In the embodiment of FIG. 5 the actuator 15 is arranged outside the housing 10. The housing 10 is attached to the actuator 15 which in turn is fixed to a stationary holding fixture 30. In the housing 10 the valve seat 17 is arranged which in this case is permanently fixed to the housing.

The inlet opening 12 is connected with a flexible line 31 since in this embodiment the complete housing 10 is movably attached to the actuator 15. When the actuator 15 is operated, the housing 10 and the valve seat 17 contained therein are moved in the direction indicated by the bidirectional arrow 32.

In the embodiment of FIG. 6 the actuator 15 is also attached to a stationary holding fixture 30 and moves the housing 10 in vertical direction. In the housing 10 the valve seat 17 is arranged in such a way that its seat extends in parallel in the moving direction 32 of the actator 15. When the actuator 15 is operated, the valve seat 17 is displaced in parallel to its plane without the ball 19 being capable of following this rapid displacement. Only by the subsequently occurring flow through the outlet opening 13 is the ball 19 moved back into the closing position on seat 17. As shown in FIG. 6, said valve operates even with vertically oriented seat. Of course, seat 17 may also be horizontally oriented.

Although a preferred embodiment of the invention has been specifically illustrated and described herein, it is to be understood that minor variations may be made in the apparatus without departing from the spirit and scope of the invention, as defined the appended claims.

What is claimed is:

1. A quick-acting valve comprising a chamber (11) having an inlet opening (12 or 25) and an outlet opening (13) and containing a movable valve seat (17) capable of being closed by a movable unrestrained valve body (19), the unrestrained valve body (19) being configured to be pressed into a closed position against the valve seat (17) by a fluid introduced into the chamber (11) through the inlet opening (12), said movable valve seat (17) being housed in said chamber (11) for movement relative to an actuator (15) which moves the movable valve seat (17) in response to an actuating signal, the actuator (15) moves the movable valve seat (17) away from the unrestrained valve body (19) in the closed position to effect opening therebetween and at a speed so rapid as to prevent the unrestrained valve body (19) from following said movable valve seat (17).

2. The quick-acting valve according to claim 1, characterized in that an outlet duct (16) passes through the actuator (15).

3. The quick-acting valve according to claim 1, characterized in that the actuator (15) is a piezoelectric body.

4. The quick-acting valve according to claim 2, characterized in that the actuator (15) is a piezoelectric body.

5. The quick-acting valve according to claim 3, characterized in that the piezoelectric body (15) is made up of a plurality of layers (20) of piezoelectric material with intermediate electrode layers (21).

6. The quick-acting valve according to claim 1, characterized in that the actuator (15) is controlled in such a way that, in response to the actuating signal, it first moves the movable valve seat (17) rapidly and then more and more slowly in order to smoothly catch the unrestrained valve body (19) lifted off the movable valve seat (17).

7. The quick-acting valve according to claim 1, characterized in that the direction of movement of the actuator (15) extends transversely to the plane of the movable valve seat (17).

8. The quick-acting valve according to claim 1, characterized in that the direction of movement of the actuator (15) extends in parallel to the plane of the movable unrestrained valve seat (17).

9. The quick-acting valve as defined in claim 1 wherein said inlet opening (12) and said outlet opening (13) are disposed in substantially axial alignment with each other.

10. The quick-acting valve as defined in claim 1 including a plurality of additional inlet openings (25), said inlet opening (12) and said plurality of additional inlet openings (25) each having an axis, and said axes are disposed in substantially radial relationship to said valve body (19).

11. The quick-acting valve as defined in claim 1 wherein said inlet opening (12) and said outlet opening (13) are disposed in substantially normal relationship to each other.

12. The quick-acting valve as defined in claim 1 wherein said inlet opening (12) and said outlet opening (13) each include an axis, and said axes are disposed in a horizontal plane.

13. The quick-acting valve as defined in claim 1 wherein said inlet opening (12) and said outlet opening (13) each include an axis, said axes are disposed in a horizontal plane, and said axes are substantially coaxial.

14. The quick-acting valve as defined in claim 1 wherein said actuator (15) is located exteriorly of said chamber (11).

15. The quick-acting valve as defined in claim 1 including a housing (10), said chamber (11) being located within said housing (10), and said actuator (15) being located within said chamber (11).

16. The quick-acting valve as defined in claim 1 including a housing (10), said chamber (11) being located within said housing (10), and said actuator (15) being located within said chamber (11) and acting substantially directly upon said movable valve seat (17).

17. The quick-acting valve as defined in claim 1 wherein said actuator (15) is located exteriorly of said chamber (11), and said actuator (15) is constructed and arranged to directly move said chamber (11) and thereby indirectly move said movable valve seat (17).

18. The quick-acting valve as defined in claim 9 wherein said actuator (15) is located exteriorly of said chamber (11).

19. The quick-acting valve as defined in claim 9 including a housing (10), said chamber (11) being located within said housing (10), and said actuator (15) being located within said chamber (11).

20. The quick-acting valve as defined in claim 9 including a housing (10), said chamber (11) being located within said housing (10), and said actuator (15) being located within said chamber (11) and acting substantially directly upon said movable valve seat (17).

21. The quick-acting valve as defined in claim 9 wherein said actuator (15) is located exteriorly of said chamber (11), and said actuator (15) is constructed and arranged to directly move said chamber (11) and thereby indirectly move said movable valve seat (17).

22. The quick-acting valve as defined in claim 11 wherein said actuator (15) is located exteriorly of said chamber (11).

23. The quick-acting valve as defined in claim 11 including a housing (10), said chamber (11) being located within said housing (10), and said actuator (15) being located within said chamber (11).

24. The quick-acting valve as defined in claim 11 including a housing (10), said chamber (11) being located within said housing (10), and said actuator (15) being located within said chamber (11) and acting substantially directly upon said movable valve seat (17).

25. The quick-acting valve as defined in claim 11 wherein said actuator (15) is located exteriorly of said chamber (11), and said actuator (15) is constructed and arranged to directly move said chamber (11) and thereby indirectly move said movable valve seat (17).

* * * * *